US009192088B2

(12) United States Patent
    Bruce

(10) Patent No.: US 9,192,088 B2
(45) Date of Patent: Nov. 24, 2015

(54) DRILL/PLANTER BLADE WITH CONCAVE EDGE

(71) Applicant: Douglas G. Bruce, West Des Moines, IA (US)

(72) Inventor: Douglas G. Bruce, West Des Moines, IA (US)

(*) Notice: Subject to any disclaimer, the term of this patent is extended or adjusted under 35 U.S.C. 154(b) by 47 days.

(21) Appl. No.: 14/028,093

(22) Filed: Sep. 16, 2013

(65) Prior Publication Data
    US 2015/0075413 A1    Mar. 19, 2015

(51) Int. Cl.
    *A01B 49/06*    (2006.01)
    *A01C 5/06*    (2006.01)
    *A01C 7/08*    (2006.01)

(52) U.S. Cl.
    CPC ............. *A01B 49/06* (2013.01); *A01C 5/064* (2013.01); *A01C 5/068* (2013.01); *A01C 7/08* (2013.01)

(58) Field of Classification Search
    CPC ........ A01B 49/06; A01B 49/04; A01B 49/00; A01C 5/064; A01C 5/062; A01C 5/06; A01C 5/00; A01C 5/068; A01C 5/066; A01C 7/08; A01C 7/00
    USPC ............. 111/14, 52, 109, 112, 149, 157, 163, 111/164
    See application file for complete search history.

(56) References Cited

U.S. PATENT DOCUMENTS

| 1,007,399 | A | 10/1911 | Spalding |
|---|---|---|---|
| 1,444,224 | A | 2/1923 | Wagner |
| 2,691,353 | A | 10/1954 | Secondo |
| 4,099,576 | A | 7/1978 | Jilani |
| 4,224,882 | A | 9/1980 | Cruse |
| 5,297,637 | A | 3/1994 | Rowlett |
| 5,855,246 | A | 1/1999 | Bruce |
| 6,508,147 | B1 | 1/2003 | Bruce |
| 7,832,345 | B2 | 11/2010 | Whalen |
| 2011/0240319 | A1 | 10/2011 | Sanderson |

OTHER PUBLICATIONS 8 pages—International Search Report and Written Opinion of ISA of corresponding international application.

*Primary Examiner* — Christopher J Novosad
(74) *Attorney, Agent, or Firm* — Sturm & Fix LLP

(57) ABSTRACT

A seed planting apparatus has a first disc is rotatably disposed about a first axis which is substantially perpendicular to a line of travel. A following trenching device has a second disc rotatably attached along a second axis transverse to the line of travel but not parallel to the first axis. A third disc is rotatably attached along a third axis which is transverse to the line of travel but not parallel to either the first axis or the second axis. At least one of the first, second and third discs has a first side has an outer periphery and a second side has an outer periphery. The second side is spaced from the first side and has a larger diameter than the first side. A transition surface between the outer periphery of the first side and the outer periphery of the second side being annular and concave.

9 Claims, 3 Drawing Sheets

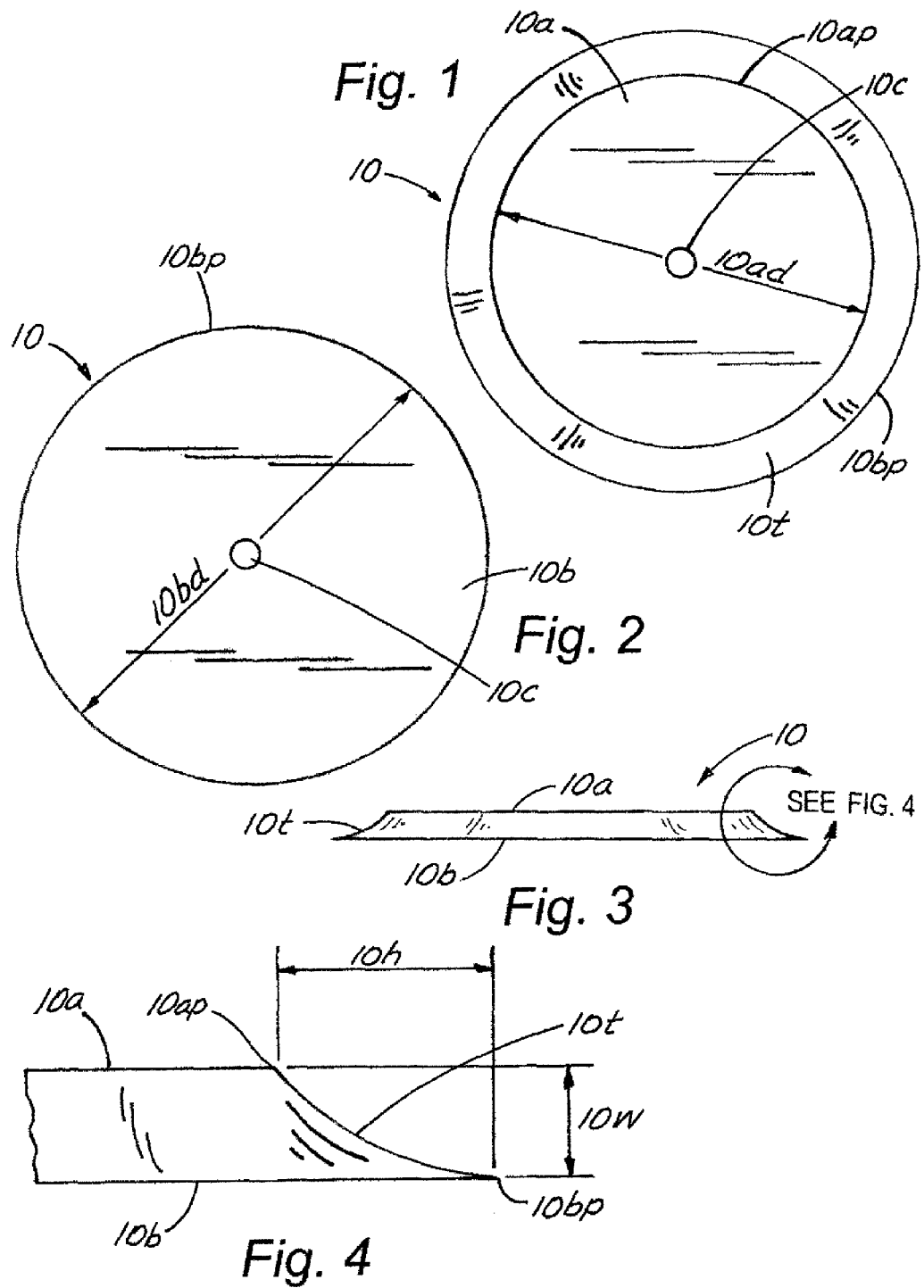

US 9,192,088 B2

DRILL/PLANTER BLADE WITH CONCAVE EDGE

TECHNICAL FIELD

This invention relates generally to an improved blade for an agricultural drill or planter and more particularly to such a blade that due to its shape will remain sharper longer than prior art blades.

BACKGROUND

Replaceable planter blades, sometimes referred to as coulters, are used on a planter or drill for cutting a slot in the ground and are also used to open a furrow so that seeds may be dropped in the furrow before the seeds are then covered up by closing the furrow and packing down the soil over the seeds. These planter blades are typically just a round flat steel disc with a sharpened outer peripheral edge. Once these blades become dull, however, they no longer work in an optimum fashion and need to be replaced or sharpened.

Accordingly, there is a need for a planter blade that stays sharper longer than those available in the past.

SUMMARY OF THE INVENTION

The present invention relates to an improved disc for a seed planting apparatus of a type which has a first disc is rotatably disposed about a first axis which is substantially perpendicular to a line of travel and a following trenching device which has a second disc rotatably attached along a second axis transverse to the line of travel but not parallel to the first axis. A third disc on the trenching device is rotatably attached along a third axis which is transverse to the line of travel but not parallel to either the first axis or the second axis. At least one of the first, second and third discs has a first side has an outer periphery and a second side has an outer periphery. The second side is spaced from the first side and has a larger diameter than the first side. A transition surface between the outer periphery of the first side and the outer periphery of the second side being annular and concave.

The blades of the present invention stay sharp longer than previously known blades of this type.

BRIEF DESCRIPTION OF THE DRAWINGS

The above needs are at least partially met through provision of the apparatus described in the following detailed description, particularly when studied in conjunction with the drawings, wherein:

FIG. 1 is a side elevational view of a first side of a planting blade of the present invention;

FIG. 2 is a side elevational view of a second side of a planting blade of the blade shown in FIG. 1;

FIG. 3 is a top view of the blade of FIGS. 1 and 2;

FIG. 4 is an enlarged view of the area circles in FIG. 3;

Figure 5:
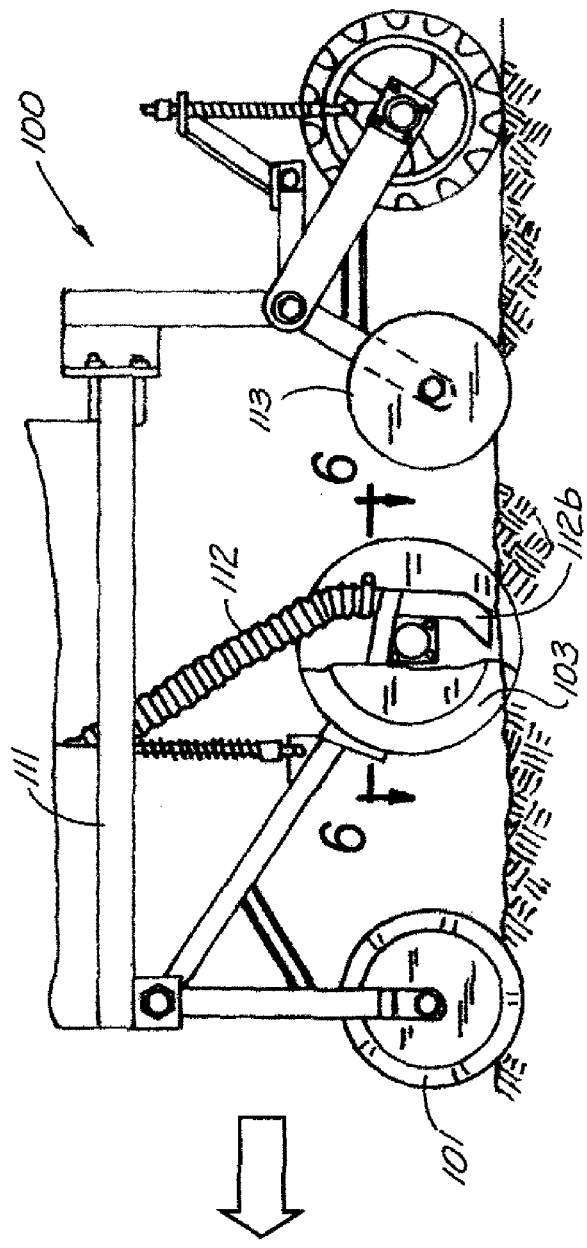
FIG. 5 is a side elevational view of a planting apparatus utilizing the planting blades of FIGS. 1-4.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-4 show a planting blade 10 constructed in accordance with the present invention.

The preferred embodiment of the blade 10 is essentially in the form of a circular disc having a first flat side 10a and a second flat side 10b. But these sides 10a and 10b do not need to be flat, it is just an economical way to cut or stamp the blades 10 from a sheet of steel, for example.

The first side 10a has an outer periphery 10ap and a second side has an outer periphery 10bp. The second side 10b is spaced from the first side 10a by a distance or width 10w as shown in FIG. 4. The second side 10b has a larger diameter 10bd than the first side 10ad. There is a transition surface 10t between the outer periphery 10ap of the first side 10a and the outer periphery 10bp of the second side 10b. The transition surface 10t is annular as can best be seen in FIG. 1 and is concave as can best be seen in FIGS. 3 and 4.

The height 10h of transition surface 10t is preferably longer than the width. This will make the blade stay sharp longer than prior art planting blades. It is preferred that the height 10h is at least fifty percent (50%) more than the width 10w, though this is not required to make the blade 10 work as intended.

Figure 6:
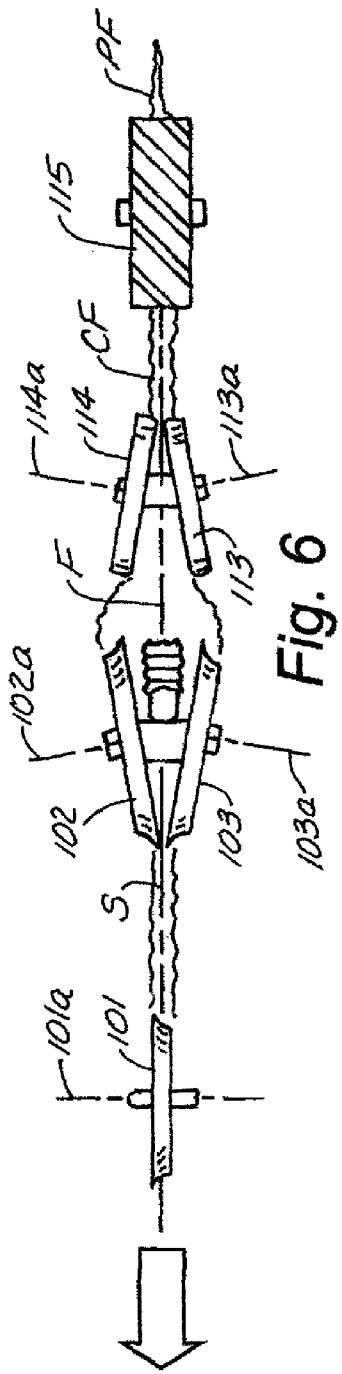
FIG. 6 is a top view of the planting apparatus of FIG. 5.
Figure 7:
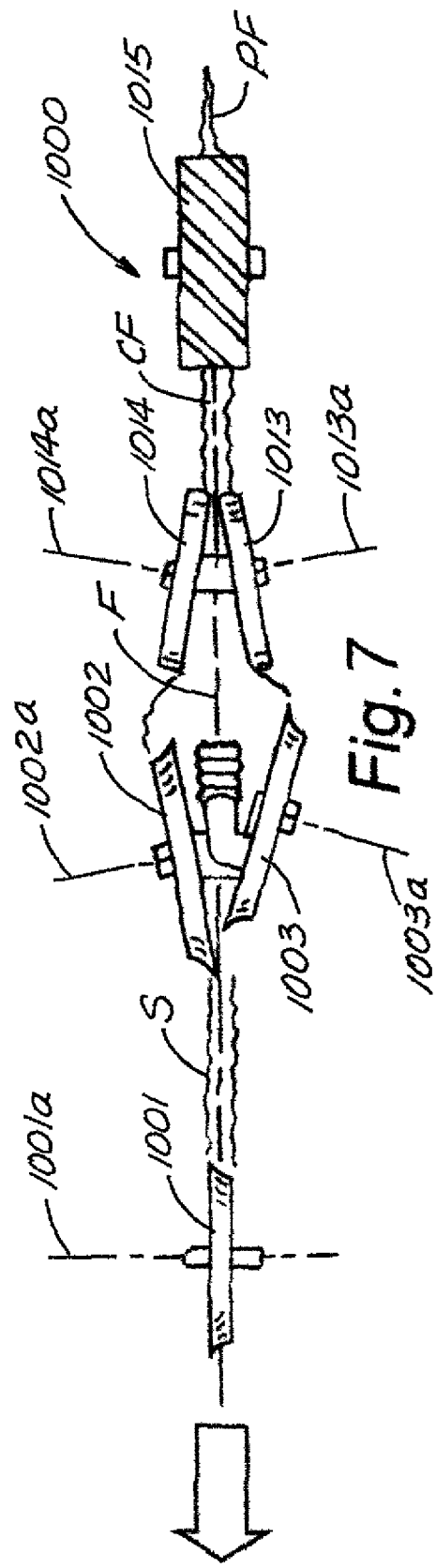
FIG. 7 is a top view of an alternate form of the planting apparatus of FIGS. 5 and 6.

The planting blade 10 shown in FIGS. 1-4 is shown in FIGS. 5-7 as planting blades 101, 102, 103, 1001, 1002 and 1003.

Looking to FIG. 5, a planter or drill unit 100 is shown somewhat schematically, it being understood that the planting blade 10 could be used on any type of planting apparatus, for example on a planting apparatus of the type typically called a "planter" used to plant rows of corn, or on a planting apparatus of the type commonly called a "drill" of the type used to plant smaller seeds closer together, such as wheat, alfalfa, etc.

Since the planter/drill planting device 100 is shown schematically, a detailed explanation of all of the parts is not believed to be necessary for one skilled in this art to understand it, so only the frame 111 and the ground engaging parts and the seed tube 112 will be discussed herein.

The frame 111 is shown only for moving forward along the arrow shown on the left side of FIG. 6. Operatively attached to the front end of the frame 111 is a first planting disc 101, constructed like the planting disc 10 of FIGS. 1-4. It could be reversed, if desired so that the leading edge is on the left when viewed from above, instead of from the right as shown in FIG. 5. That planting disc 101 is operatively rotatably mounted about an axis 101a which is preferably perpendicular to a vertical plane that the line F (forward direction) is disposed in. The planting disc 101 makes a slit S (FIG. 6) in the soil as shown in FIG. 6 as the planting disc 101 moves forwarding through the soil.

Directly following the first planting disc 101 is a matched pair of planting discs, second planting disc 102 and third planting disc 103. The second planting disc 102 is disposed for rotation about an axis 102a that is transverse to the direction F of forward movement. The third planting disc 103 is disposed for rotation about an axis 103a that is transverse to the direction F of forward movement and is also not parallel to axes 101a or 102a. This arrangement of planting discs 102 and 103 shown in FIG. 5 opens up the slot S in the soil and forms a furrow F.

A seed tube 102 drops seeds from a seed container (not shown) above the seed tube 102, through the bottom 102b of the seed tube 102 as the planting apparatus 100 moves forwardly.

Seed closing discs 113 and 114 follow the seed tube 102 and push dirt back into the furrow F to cover up the seeds (not shown) to form a closed furrow CF behind closing discs 113 and 114.

A dirt packing wheel 115 follows the seed closing discs 113 and 114 to pack the dirt in the closed furrow CF, forming a packed furrow PF behind the dirt packing wheel 115 as can be seen in FIG. 6.

An alternate form of planting apparatus 1000 is shown in FIG. 7 and is different than the planting apparatus 100 shown in FIGS. 4 and 5 only in the fact that the third planter disc 1003 is positioned rearwardly compared to the third disc 103 of the planting apparatus 100 of FIGS. 5 and 6.

Looking again at FIG. 7, the planting apparatus 1000 is shown only for moving forward along the arrow on the left side of FIG. 7. Operatively attached to the front end of the frame 1011 is a first planting disc 1001, constructed like the planting disc 10 of FIGS. 1-4. It could be reversed, if desired so that the leading edge is on the left when viewed from above, instead of from the right as shown in FIG. 5. That planting disc 101 is operatively rotatably mounted about an axis 101a which is preferably perpendicular to a vertical plane that the line on the left side of FIG. 7 that indicates the forward direction is disposed in. The planting disc 1001 makes a slit S (FIG. 7) in the soil as shown in FIG. 7 as the planting disc 1001 moves forwarding through the soil.

Directly following the first planting disc 1001 is a matched pair of planting discs, second planting disc 1002 and third planting disc 1003. The second planting disc 1002 is disposed for rotation about an axis 1002a that is transverse to the direction forward movement. The third planting disc 1003 is disposed for rotation about an axis 1003a that is transverse to the direction of forward movement and is also not parallel to axes 1001a or 1002a. This arrangement of planting discs 1002 and 1003 shown in FIG. 7 opens up the slot S in the soil and forms a furrow F.

A seed tube 1002 drops seeds from a seed container (not shown) above the seed tube 1002, through the bottom 1002b of the seed tube 1002 as the planting apparatus 1000 moves forwardly.

Seed closing discs 1013 and 1014 follow the seed tube 1002 and push dirt back into the furrow F to cover up the seeds (not shown) to form a closed furrow CF behind closing discs 1013 and 1014.

A dirt packing wheel 1015 follows the seed closing discs 1013 and 1014 to pack the dirt in the closed furrow CF, forming a packed furrow PF behind the dirt packing wheel 115 as can be seen in FIG. 6.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. A seed planting apparatus comprising:
    a frame having a front and a rear and moveable along a line of travel in a forward direction;
    a first disc operatively rotatably attached to a first part of the frame about a first axis, the first axis being substantially perpendicular to the a vertical plan containing the line of travel of the frame;
    a trenching device operatively attached to the frame for forming a trench in the soil, the trenching device comprising:
        a second disc operatively rotatably attached along a second axis which is transverse to the line of travel but not parallel to the first axis; and
        a third disc operatively rotatably attached along a third axis which is transverse to the line of travel but not parallel to either the first axis or the second axis;
    a seed guiding tube for guiding seeds into the trench;
    a trench filling device for filling soil into the trench on top of the seeds; and
    wherein at least one of the first, second and third discs has a configuration comprising:
    a first side having an outer periphery and a second side having an outer periphery, the second side being spaced from the first side, the second side having a larger radially outer periphery diameter than a radially outer periphery of the first side and there being a transition surface between the outer periphery of the first side and the outer periphery of the second side, said transition surface being annular and concave; and
    wherein at least a first portion of the first side lies in a first plane and a first portion of the second side, at the radially outer periphery diameter of the first side, lies in a second plane, and wherein the first plane is parallel to the second plane.

2. The seed planting apparatus of claim 1 wherein said first disc has said configuration.

3. The seed planting apparatus of claim 1 wherein said second disc has said configuration.

4. The seed planting apparatus of claim 1 wherein said third disc has said configuration.

5. The seed planting apparatus of claim 1 wherein all three of said first, second and third discs have said configuration.

6. The seed planting apparatus of claim 1 including a firming wheel operatively attached to the frame and following the trench filling device for packing the soil in the trench after the trench has been filled.

7. The seed planting apparatus of claim 1 including a firming wheel operatively attached to the frame and following the trench filling device for packing the soil in the trench after the trench has been filled.

8. A seed planting apparatus comprising:
    a frame having a front and a rear and moveable along a line of travel in a forward direction;
    a first disc operatively rotatably attached to a first part of the frame about a first axis, the first axis being substantially perpendicular to a vertical plane containing the line of travel of the frame;
    a trenching device for forming a trench in the soil;
    a seed guiding tube for guiding seeds into the trench;
    a trench filling device for filling soil into the trench on top of the seeds; and
    wherein the first disc has a first side having an outer periphery and a second side having an outer periphery, the second side being spaced from the first side, the second side having a radially outer periphery larger than a radially outer periphery of the first side and there being a transition surface between the outer periphery of the first side and the outer periphery of the second side, said transition surface being annular and concave; and wherein at least a first portion of the first side lies in a first plane and a first portion of the second side, at the radially outer periphery diameter of the first side, lies in a second plane, and wherein the first plane is parallel to the second plane.

9. A ground engaging disc comprising:

a circular body having a first side with a radially outer periphery and a second side with a radially outer periphery, the second side being spaced from the first side, the second side having a larger diameter than the first side and there being a transition surface between the outer periphery of the first side and the outer periphery of the second side, said transition surface being annular and concave; and wherein at least a first portion of the first side lies in a first plane and a first portion of the second side, at the radially outer periphery diameter of the first side, lies in a second plane, and wherein the first plane is parallel to the second plane.

* * * * *